US012661895B2

(12) United States Patent
Hayashida

(10) Patent No.: US 12,661,895 B2
(45) Date of Patent: Jun. 23, 2026

(54) CLEANING LIQUID, METHOD OF CLEANING NOZZLE SURFACE, AND RECORDING DEVICE

(71) Applicant: BROTHER KOGYO KABUSHIKI KAISHA, Nagoya (JP)

(72) Inventor: Kenta Hayashida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 652 days.

(21) Appl. No.: 18/055,904

(22) Filed: Nov. 16, 2022

(65) Prior Publication Data

US 2023/0077587 A1 Mar. 16, 2023

Related U.S. Application Data

(63) Continuation of application No. PCT/JP2021/018374, filed on May 14, 2021.

(30) Foreign Application Priority Data

May 18, 2020 (JP) ................................ 2020-086695

(51) Int. Cl.
*C11D 1/00* (2006.01)
*B41J 2/165* (2006.01)
(Continued)

(52) U.S. Cl.
CPC ............ *B41J 2/16552* (2013.01); *C11D 1/00* (2013.01); *C11D 1/02* (2013.01); *C11D 1/88* (2013.01);
(Continued)

(58) Field of Classification Search
CPC .... C11D 1/00; C11D 1/02; C11D 1/88; C11D 3/2041; C11D 3/2065
(Continued)

(56) References Cited

U.S. PATENT DOCUMENTS

2002/0010115 A1* 1/2002 Yano ................. C11D 17/0013 134/42
2010/0164651 A1* 7/2010 Erb ..................... H01P 1/20345 333/204
(Continued)

FOREIGN PATENT DOCUMENTS

EP 3594295 A1 * 1/2020 .............. C11D 3/32
JP H06-8437 B2 7/1987
(Continued)

OTHER PUBLICATIONS

International Search Report issued Aug. 3, 2021 in PCT/JP2021/018374 (with English translation).
(Continued)

*Primary Examiner* — Gregory R Delcotto
(74) *Attorney, Agent, or Firm* — Element IP, PLC

(57) ABSTRACT

A cleaning liquid includes a water-soluble organic solvent and a surfactant. The water-soluble organic solvent includes a low-vapor-pressure solvent having a saturated vapor pressure of 1.0 Pa or less at 20° C. A ratio of 1,000 times a total mass of the surfactant to a mass of the water-soluble organic solvent is greater than 0.5. A rate at which droplets of the cleaning liquid slide down on a surface to be cleaned is 3.0 mm/s or less. The rate at which droplets of the cleaning liquid slide down on the surface to be cleaned is preferably 2.5 mm/s or less. A viscosity of the cleaning liquid at 25° C. is preferably 8 mPa·s or greater. A surface tension of the cleaning liquid is preferably 50 mN/m or less.

14 Claims, 3 Drawing Sheets

(51) Int. Cl.

| | |
|---|---|
| ***C11D 1/02*** | (2006.01) |
| ***C11D 1/88*** | (2006.01) |
| ***C11D 3/16*** | (2006.01) |
| ***C11D 3/20*** | (2006.01) |
| ***C11D 3/43*** | (2006.01) |

(52) U.S. Cl.

CPC .................. *C11D 3/16* (2013.01); *C11D 3/20* (2013.01); *C11D 3/2041* (2013.01); *C11D 3/2065* (2013.01)

(58) Field of Classification Search

USPC ....... 510/118, 170, 171, 421, 426, 505, 506, 510/499, 501

See application file for complete search history.

(56) References Cited

U.S. PATENT DOCUMENTS

| | | | | |
|---|---|---|---|---|
| 2013/0176359 | A1 | 7/2013 | Roberts et al. | |
| 2014/0085376 | A1 | 3/2014 | Kato et al. | |
| 2017/0183528 | A1* | 6/2017 | Kohzuki | C09D 11/54 |
| 2019/0255854 | A1 | 8/2019 | Asano et al. | |
| 2019/0344569 | A1* | 11/2019 | Sai | C11D 1/72 |
| 2020/0016898 | A1 | 1/2020 | Sagara et al. | |

FOREIGN PATENT DOCUMENTS

| | | | | | |
|---|---|---|---|---|---|
| JP | 2001212948 | A | | 8/2001 | |
| JP | 2012179825 | A | | 9/2012 | |
| JP | 2019043030 | A | | 3/2019 | |
| JP | 2019044072 | A | | 3/2019 | |
| JP | 2019104251 | A | | 6/2019 | |
| JP | 2020015890 | A | | 1/2020 | |
| WO | WO-2020175033 | A1 | * | 9/2020 | B41J 2/16552 |
| WO | WO-2020241016 | A1 | * | 12/2020 | C11D 3/43 |
| WO | WO-2020241017 | A1 | * | 12/2020 | C11D 3/2068 |

OTHER PUBLICATIONS

International Preliminary Report on Patentability and Written Opinion issued Nov. 17, 2022 in PCT/JP2021/018374 (with English translation), 8 pages.

Extended European Search Report issued May 10, 2024 in corresponding European Patent Application No. 21809473.8, 7 pages.

* cited by examiner

CLEANING LIQUID, METHOD OF CLEANING NOZZLE SURFACE, AND RECORDING DEVICE

CROSS-REFERENCE TO RELATED APPLICATIONS

The present application is a continuation application of International Application No. PCT/JP2021/018374, filed May 14, 2021, which claims priority to Japanese Patent Application No. 2020-086695 filed May 18, 2020. The contents of these applications are incorporated herein by reference in their entirety.

BACKGROUND OF THE DISCLOSURE

Technical Field

The present disclosure relates to a cleaning liquid, a method of cleaning a nozzle surface, and a recording device.

Background Art

A printing device that fixates ink discharged from a nozzle of a print head and adhered to a recording medium by heating the recording medium with a heater is known.

SUMMARY OF THE DISCLOSURE

According to an aspect of the present invention, a cleaning liquid includes a water-soluble organic solvent and a surfactant. The water-soluble organic solvent includes a low-vapor-pressure solvent having a saturated vapor pressure of 1.0 Pa or less at 20° C. A ratio of 1,000 times a total mass of the surfactant to a mass of the water-soluble organic solvent is greater than 0.5. A rate at which droplets of the cleaning liquid slide down on a surface to be cleaned is 3.0 mm/s or less.

According to another aspect of the present invention, a method of cleaning a nozzle surface of a printer head which dispenses a water-based ink, includes attaching a cleaning liquid to a wiper, and sliding the wiper on the nozzle surface after the nozzle discharges a water-based ink. The cleaning liquid includes a water-soluble organic solvent and a surfactant. The water-soluble organic solvent includes a low-vapor-pressure solvent having a saturated vapor pressure of 1.0 Pa or less at 20° C. A ratio of 1,000 times a total mass of the surfactant to a mass of the water-soluble organic solvent is greater than 0.5. A rate at which droplets of the cleaning liquid slide down on a surface to be cleaned is 3.0 mm/s or less.

According to a further aspect of the present invention, a recording device includes: a head including a nozzle which discharges a water-based ink from the nozzle; a wiper including a tip part to wipe a nozzle surface of the head; a wiper cleaning member configured to contact the tip part, and the above-described cleaning liquid, held by the wiper cleaning member.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
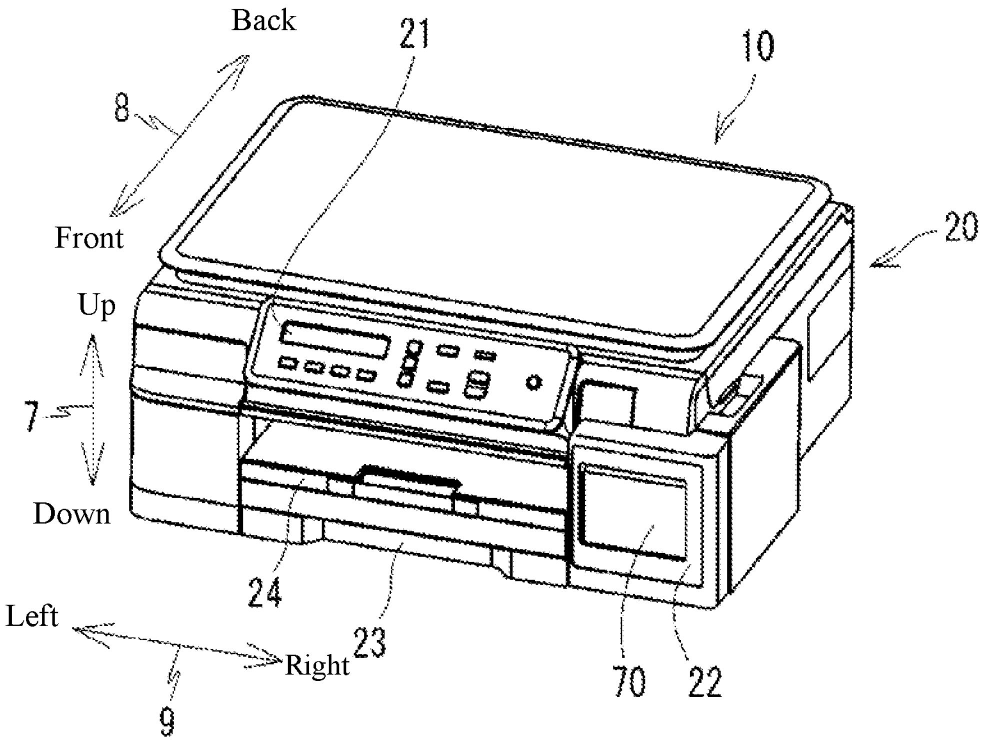
FIG. 1 is a perspective view of a recording device 10.

As used herein, the words "a" and "an" and the like carry the meaning of "one or more." When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

Ink adhered to a nozzle surface of a print head is removed by wiping the nozzle surface with a wiper after performing a purge for forcibly dispensing ink from a nozzle of the print head, a flush for continuously discharging ink droplets from the nozzle of the printhead, or the like However, when ink that dries easily adheres to the nozzle surface, there is a risk that the ink will dry and solidify on the nozzle surface and cannot be removed from the nozzle surface even when wiped with a wiper. As a result, the water repellency of the nozzle surface deteriorates, and there is a risk that the ink will not be discharged normally from the nozzle. In particular, this risk is increased for printing devices equipped with a heater or the like and in which the temperature inside the device readily increases.

An embodiment of the present disclosure is a cleaning liquid for cleaning a nozzle surface of a head for dispensing a water-based ink from a nozzle. The cleaning liquid contains a water-soluble organic solvent and a surfactant. The water-soluble organic solvent contains a solvent A having a saturated vapor pressure of 1.0 Pa or less at 20° C. The ratio of 1,000 times the total mass of the surfactant to the mass of the water-soluble organic solvent is greater than 0.5. The rate at which droplets of the cleaning liquid slide down on the nozzle surface is 3.0 mm/s or less.

Other embodiments of the present disclosure a cleaning method using the cleaning liquid and a recording device.

By the embodiments of the present disclosure, drying and solidification of ink on the nozzle surface of the head are suppressed.

The recording device 10 according to an embodiment of the present disclosure will be described below. Note that the embodiment described below is merely one example of the present disclosure, and it goes without saying that the embodiment can be appropriately changed within a scope that does not change the essence of the present disclosure. Furthermore, in the description below, movement from the start point to the end point of the arrow is expressed as an orientation, and traffic on the line connecting the start point and the end point of the arrow is expressed as a direction. Moreover, in the description below, a vertical direction 7 is defined with reference to a state in which the recording device 10 is installed so as to be usable (state of FIG. 1), a front and back direction 8 is defined such that a side where a dispensing port 13 is provided as the front side (front surface), and a left and right direction 9 is defined from a point of view of the recording device 10 from a front side (front surface).

[External Configuration of the Recording Device 10]

As illustrated in FIG. 1, the recording device 10 is provided with a housing 20, and a panel unit 21, a cover 22, a paper feed tray 23, and a paper dispensing tray 24, held by the housing 20. The recording device 10 records an image on a sheet 6 (see FIG. 2).

The sheet 6 is an example of a recording medium. The sheet 6 may be a recording medium that is cut to a predetermined dimension, it may be drawn from a roll wound in a cylindrical shape, or it may be of a fan-fold type. The sheet 6 may be non-coated paper or coated paper. “Coated paper” means, for example, paper composed of pulp of high-quality printing paper or medium-quality printing paper and coated with a coating agent in order to improve smoothness, whiteness, glossiness, and the like, and specific examples include high-quality coated paper, medium-quality coated paper, and the like. Furthermore, the sheet 6 may be sticker paper that combines an adhesive and release paper.

The panel unit 21 is provided with a touch panel and a plurality of operation switches. The panel unit 21 accepts user operations.

As illustrated in FIG. 1, a paper feed tray 23 is positioned on a lower portion of the housing 20. The paper dispensing tray 24 is a lower part of the housing 20 and is positioned on the paper feed tray 23. A cover 22 is positioned on a right part of the front surface of the housing 20. The cover 22 can be rotated with respect to the housing 20. When the cover 22 is opened, a tank 70 for storing ink can be accessed.

Note that while only one tank 70 is illustrated in the present embodiment, the tank 70 is not limited to storing ink of one color such as black, and it may have four storage chambers that, for example, respectively store ink of the four colors of black, yellow, cyan, and magenta.

[Print Engine 50]

Figure 2:
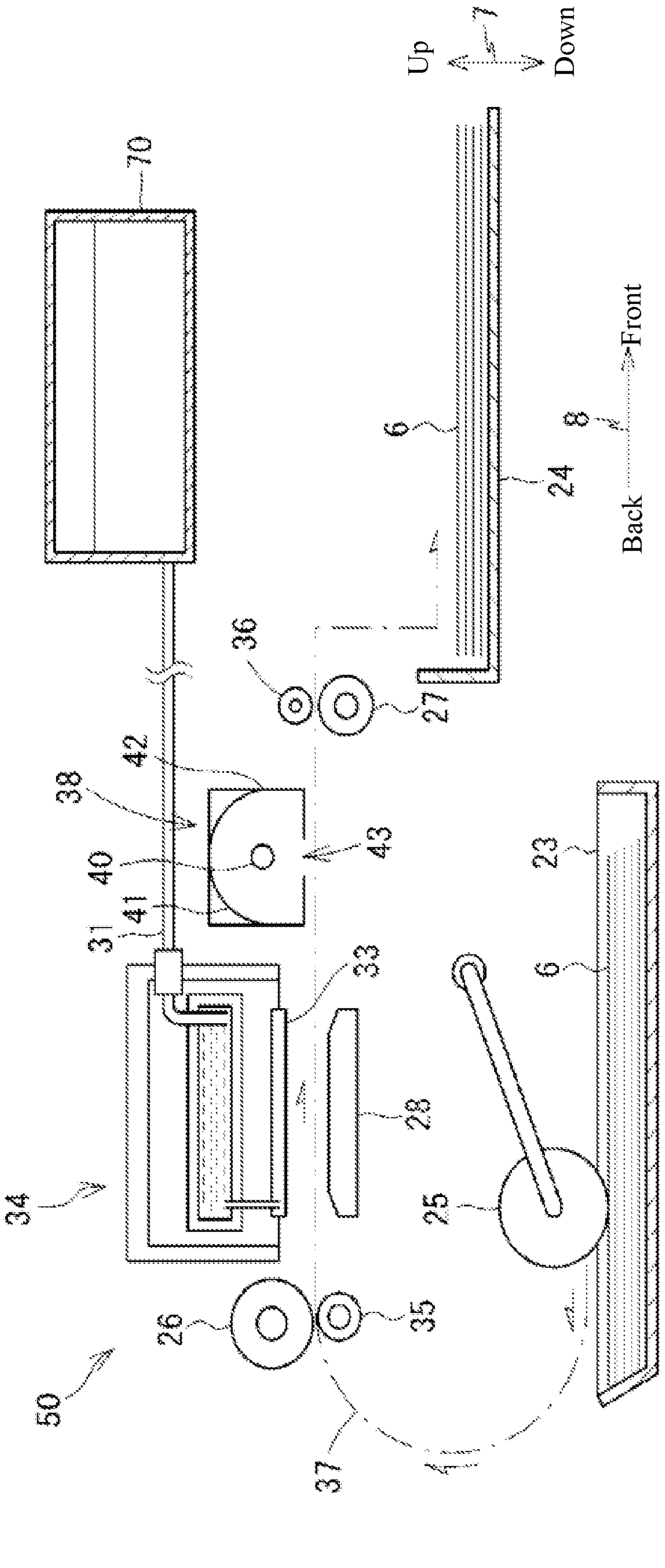
FIG. 2 is a schematic diagram illustrating an internal configuration of the recording device 10.

As illustrated in FIG. 2, the housing 20 holds a print engine 50 therein. The print engine 50 is mainly provided with a print head 34 (an embodiment of the head) a feed roller 25, a conveyance roller 26, a dispensing roller 27, a platen 28, and a heater 38. The feed roller 25 is held by a frame not illustrated provided in the housing 20 so as to be able to abut the sheet 6 placed on the paper feed tray 23. The feed roller 25 is rotated by a motor not illustrated. The rotating feed roller 25 sends the sheet 6 to a conveyance path 37. The conveyance path 37 is a space partitioned by a guide member not illustrated. In the illustrated embodiment, the conveying path 37 extends curving from a rear end of the paper feed tray 23 to a position above the paper feed tray 23 and then extends forward.

The conveyance roller 26 is positioned downstream of the paper feed tray 23 in the conveying direction of the sheet 6. The conveyance roller 26 forms a roller pair together with a driven roller 35. The conveyance roller 26 is rotated by a motor not illustrated. The rotating conveyance roller 26 and the driven roller 35 simultaneously sandwich and convey the sheet 6 sent to the conveyance path 37 by the feed roller 25. The dispensing roller 27 is positioned downstream of the conveyance roller 26 in the conveying direction of the sheet 6. The dispensing roller 27 forms a roller pair together with a driven roller 36. The dispensing roller 27 is rotated by a motor not illustrated. The rotating dispensing roller 27 and the driven roller 36 simultaneously sandwich and convey the sheet 6 and dispense it in the paper dispensing tray 24. The platen 28 is positioned between the conveyance roller 26 and the dispensing roller 27 in the front and back direction 8, downstream of the conveyance roller 26, and upstream of the dispensing roller 27 in the conveyance direction of the sheet 6.

The print head 34 is positioned between the conveyance roller 26 and the dispensing roller 27. The print head 34 is a so-called serial head. That is, the print head 34 can be moved in the left and right direction 9. The print head 34 is normally positioned at a maintenance position described later and covered by a cap 71 (see FIG. 3). The print head 34 has therein a channel in which ink flows. The channel is made continuous with the tank 70 by a tube 31. That is, ink stored in the tank 70 is supplied to the print head 34 through the tube 31. The print head 34 has a plurality of nozzles 33 opened toward the platen 28. In the printing head 34, a surface where the nozzle 33 is opened is a nozzle surface 33A. Ink supplied to the print head 34 through the channel is selectively discharged as ink drops from the plurality of nozzles 33 while the print head 34 is moving. Note that the print head 34 may be a line head instead of a serial head. When it is a line head, the wiper 72 (see FIG. 3) is moved with respect to the line head to wipe the nozzle surface.

The platen 28 is positioned below the print head 34. An upper surface of the platen 28 is a supporting surface of the sheet 6. Although not shown in each drawing, an opening that generates suction pressure is formed on the upper surface of the platen 28. The sheet 6 is brought into close contact with the upper surface of the platen 28 via suction pressure generated on the upper surface of the platen 28.

Figure 3:
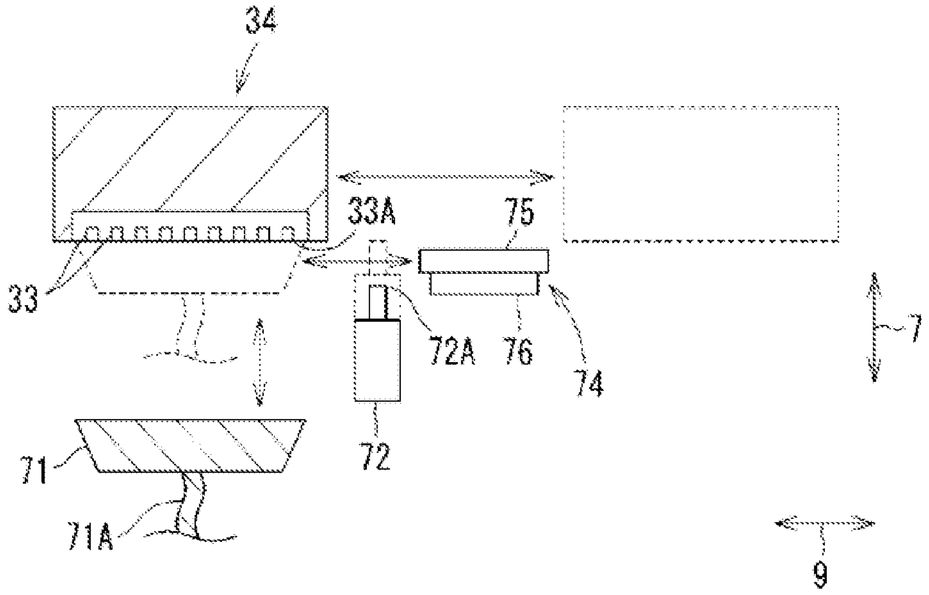
FIG. 3 is a schematic diagram illustrating a print head 34, a cap 71, a wiper 72, and a wiper cleaning member 74.

As illustrated in FIG. 2 and FIG. 3, the heater 38 is positioned above the conveyance path 37 downstream of the print head 34 and upstream of the dispensing roller 27. The heater 38 is a so-called halogen heater.

As illustrated in FIG. 2, the heater 38 is positioned downstream, that is, in front of, the print head 34 in the conveyance direction. The heater 38 has a halogen lamp 40, which is a heating element that radiates infrared rays, a reflecting plate 41, and a housing 42. The housing 42 has a shape substantially like a rectangular prism and opens downward. An opening 43 is positioned on a lower wall of the housing 42. Heat from the halogen lamp 40 and the reflecting plate 41 is radiated externally through the opening 43 or is blocked.

The halogen lamp 40 is positioned in an internal space of the housing 42. The halogen lamp 40 has an elongated cylindrical shape, and the left and right direction 9 is a longitudinal direction. In the internal space of the housing 42, the reflecting plate 41 is positioned above the halogen lamp 40. The reflecting plate 41 is a metal plate coated with a ceramic film or the like and is curved in an arc shape having a center axis near the opening 43. Note that a halogen lamp 40 coated with a ceramic film or the like may be used instead of the reflective plate 41.

The heater 38 heats at least one of the sheet 6 passing below the opening 43 and the ink adhered to the sheet 6. In this embodiment, the heater 38 heats both the sheet 6 and the ink. By heating the ink, evaporation of moisture and solvent components occurs, and the ink is fixated on the sheet 6.

The heater 38 is not limited to a halogen heater insofar as the sheet or ink can be heated. For example, the heater 38 may be a carbon heater, a dryer, an oven, a belt conveyor oven, or the like.

[Cap 71 and Wiper 72]

As illustrated in FIG. 3, the cap 71 is configured from an elastic material such as rubber. The cap 71 is positioned below the print head 34 in the maintenance position. The cap 71 has a cup shape opening upward. The cap 71 is movable in the vertical direction 7. As illustrated by the dashed line in FIG. 3, the cap 71 closely contacts to the nozzle surface 33A of the print head 34 in the maintenance position and covers the openings of all the nozzles 33.

A waste ink tube 71A is connected to the cap 71. Specifically, a dispensing port is formed on a bottom of the cap 71. One end of the waste ink tube 71A is connected to the dispensing port such that fluid is communicable. The other end of the waste ink tube 71A is connected to a waste ink tank (not illustrated).

The print head 34 is subjected to a flushing process or a purge process while covered with the cap 71. The ink in the print head 34 is forcibly dispensed by the flushing process or purge process. The ink dispensed from the print head 34 is received by the cap 71 and guided to the waste ink tank via the waste ink tube 71A.

As illustrated in FIG. 3, the wiper 72 can move in the vertical direction 7 at the side of the cap 71. The wiper 72 moves in the vertical direction 7 while holding a tip of a wiper blade configured from an elastic material such as rubber upward. When the wiper 72 is positioned upward, a tip part 72A of the wiper blade abuts the nozzle surface 33A of the printing head 34 moving in the left and right direction 9. Thus, the ink droplets adhered to the nozzle surface 33A of the print head 34 are wiped off by the wiper 72.

The mechanism by which drying and solidification of ink on the nozzle surface 33A of the print head 34 are suppressed by the cleaning liquid is presumably as follows. Namely, when the cleaning liquid is not adhered to the nozzle surface 33A, the ink attached to the nozzle surface 33A evaporates due to changes over time, and thereby the solid content in the ink is dried, becoming fixed to the nozzle surface 33A. It is difficult to remove the dried and solidified ink fixed to the nozzle surface 33A using the wiper 72, and thus it is difficult to clean the nozzle surface 33A even when the wiper 72 is slid on the nozzle surface 33A. Conversely, when the cleaning liquid is applied to the nozzle surface 33A of the recording device 10, after the nozzle surface 33A is slid by the wiper 72 while using the cleaning liquid, the speed at which the cleaning liquid slides down the nozzle surface 33A is 3.00 mm/s or less, and thus the cleaning liquid remains on the nozzle surface 33A. The cleaning liquid remaining on the nozzle surface 33A contains a water-soluble organic solvent described later, and thus it is in a liquid state for a given period. The cleaning liquid prevents the ink adhered to the nozzle surface 33A from being dried and solidified and from being fixed to the nozzle surface 33A, and the ink is kept in a liquid state for a given period. Thus, when the wiper 72 is slid on the nozzle surface 33A in a subsequent cleaning operation, the nozzle surface 33A is cleaned. Note that driving of the wiper 72 is controlled such that the cleaning liquid remains while removing the ink adhered to the nozzle surface 33A.

[Wiper Cleaning Member 74]

As illustrated in FIG. 3, the wiper cleaning member 74 is positioned below the print head 34. The wiper cleaning member 74 includes a cleaner carriage 75 and a wiper cleaner 76. The cleaner carriage 75 is a frame body made of resin having a rectangular outer shape when viewed from above. The wiper cleaner 76 is supported by the cleaner carriage 75. The wiper cleaner 76 has a substantially rectangular prism shape. The wiper cleaner 76 is a foam (foamed body) for wiping the ink adhered to the tip part 72A of the wiper 72. The wiper cleaner 76 holds the cleaning liquid. A lower surface of the wiper cleaner 76 is in the front and back direction 8 and the left and right direction 9 and is positioned slightly below the tip part 72A of the wiper 72 positioned downward (cleaning position) as illustrated by the solid line in FIG. 3. An upper surface and upper part of the wiper cleaner 76 are positioned above the tip part 72A of the wiper 72 positioned downward (cleaning position). Note that the configuration for supplying the cleaning liquid to the tip part 72A of the wiper 72 is not limited to the wiper cleaner 76, and other known configurations may be adopted, such as a configuration that discharges the cleaning liquid onto the wiper, a configuration in which the cleaning liquid seeps from the inside of the wiper, or a configuration in which the cleaning liquid is supplied from near a member to which the wiper is fixed.

[Ink Composition]

Details of the ink (an embodiment of the water-based ink) stored in the tank 70 are described below. In the present embodiment, the ink includes a water-soluble organic solvent, water, and a solid component that can be dispersed in water. Examples of the solid component include coloring materials, such as pigments, and polymer compounds.

The pigment may be a self-dispersing pigment that can be dispersed without an additional dispersant, or it may be a resin-dispersed pigment. The resin-dispersed pigment is able to be dispersed in water by, for example, a pigment dispersion resin (resin dispersant). The resin-dispersed pigment is not particularly limited, and examples include carbon black, inorganic pigments, organic pigments, and the like. Examples of the carbon black include furnace black, lamp black, acetylene black, channel black, and the like. Examples of inorganic pigments include titanium oxide, iron oxide based inorganic pigments, carbon black based inorganic pigments, and the like. Examples of organic pigments include: azo pigments such as azo lakes, insoluble azo pigments, condensed azo pigments, and chelate azo pigments; polycyclic pigments such as phthalocyanine pigments, perylene and perinone pigments, anthraquinone pigments, quinacridone pigments, dioxazine pigments, thioindigo pigments, isoindolinone pigments, and quinophthalone pigments; dye lake pigments such as basic dye type lake pigments and acidic dye type lake pigments; nitro pigments; nitroso pigment; aniline black daylight fluorescent pigments; and the like. Other examples of resin-dispersed pigments include: C.I. Pigment Black 1, 6, and 7; C.I. Pigment Yellow 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Orange 31 and 43; C.I. Pigment Red 2, 3, 5, 6, 7, 12, 15, 16, 48, 48:1, 48:3, 53:1, 57, 57:1, 112, 122, 123, 139, 144, 146, 149, 150, 166, 168, 175, 176, 177, 178, 184, 185, 190, 202, 209, 221, 222, 224, 238, and 254; C. I. Pigment Violets 19 and 196; C. I. Pigment Blue 1, 2, 3, 15, 15:1, 15:2, 15:3, 15:4, 16, 22, and 60; C. I. Pigment Green 7 and 36; solid solutions of these pigments; and the like. Note that the ink may further contain other pigments, dyes, and the like in addition to the resin-dispersed pigment.

The solid component content of coloring material in the total amount of the ink is not particularly limited and can be suitably determined, for example, by a desired optical density, chroma, or the like. When the coloring material is a pigment, solid pigment content is the mass of only the pigment and does not include the mass of the fine resin particles. One type of resin dispersion pigment may be used alone, or two or more types may be used in combination.

In embodiments, the polymer compound is fine resin particles. Fine resin particles containing at least one of methacrylic acid and acrylic acid as a monomer can be used as the fine resin particles, and for example, a commercial product can be used. The fine resin particles may further contain styrene, vinyl chloride, or the like as a monomer.

The fine resin particles may be contained, for example, in a resin emulsion. The resin emulsion is composed of, for example, fine resin particles and a dispersion medium (for example, water or the like). The fine resin particles are dispersed in a specific particle diameter range without being dissolved in the dispersion medium. Examples of fine resin particles contained in the resin emulsion include acrylic acid resins, maleic acid ester resins, vinyl acetate resins, carbonate resins, polycarbonate resins, styrene resins, ethylene resins, polyethylene resins, propylene resins, polypropylene resins, urethane resins, polyurethane resins, polyester resins, and copolymer resins of these. The fine resin particle content in the total amount of the ink is not particularly limited. One type of fine resin particle may be used alone, or two or more types may be used in combination.

Examples of the water-soluble organic solvent include glycerin, triethylene glycol, butylene glycol, dipropylene glycol, tripropylene glycol, thiodiglycol, trimethylolpropane, trimethylolethane, polyethylene glycol, polypropylene glycol, and the like. One type of the organic solvents may be used alone, or two or more types may be used in combination.

The water is preferably deionized water or pure water.

The ink may further contain a conventionally known additive as necessary. Examples of additives include surfactants, pH adjusting agents, surface tension adjusting agents, viscosity modifier, fungicides, and the like. Examples of the viscosity modifiers include polyvinyl alcohol, cellulose, water soluble resin, and the like.

The ink can be prepared, for example, by uniformly mixing a resin dispersion pigment, fine resin particles, a specific organic solvent, water, and, as necessary, other added components using a conventionally known method and removing insoluble matter using a filter or the like.

[Composition of Cleaning Liquid]

The details of the cleaning liquid held by the wiper cleaner 76 of the wiper cleaning member 74 will be described below. The cleaning liquid contains a water-soluble organic solvent, a surfactant, and water.

The saturated vapor pressure of the water-soluble organic solvent is preferably 1.0 Pa or less at 20° C., more preferably 0.5 Pa or less at 20° C. Since the saturated vapor pressure of the water-soluble organic solvent is within this range, the water-soluble organic solvent does not readily evaporate from the cleaning liquid. As a result, the ink adhered to the wiper 72 and the cleaning liquid held by the wiper cleaner 76 are easily replaced, and the cleaning effect of the wiper 72 is kept for a long time. The water-soluble organic solvent (solvent A) having a saturated vapor pressure at 20° C. that satisfies the above range is preferably 60 mass % or more relative to the total mass of the water-soluble organic solvent, more preferably within a range of 70 to 80 mass %.

The viscosity of the water-soluble organic solvent is preferably within a range of 10 mPa·s to 500 mPa·s, more preferably within a range of 25 mPa·s to 500 mPa·s, and particularly preferably within a range of 40 mPa·s to 500 mPa·s.

Examples of the water-soluble organic solvent include glycerin, diethylene glycol, triethylene glycol, butylene glycol, propylene glycol, dipropylene glycol, tripropylene glycol, thiodiglycol, polyethylene glycol, polypropylene glycol, and the like. One type of the water-soluble organic solvents may be used alone, or two or more types may be used in combination. The content of the water-soluble organic solvent relative to the total mass of the cleaning liquid is preferably 75 mass % or more. The average molecular weight of the polyethylene glycol is, for example, 180 to 200.

The surfactant is preferably anionic, amphoteric, or non-polar. One type of surfactant may be used alone, or two or more types may be used in combination. The surfactant content relative to the total mass of the cleaning liquid is preferably within a range of 0.07 to 1.00 mass % as the active ingredient, more preferably within a range of 0.07 to 0.30 mass % as the active ingredient, and more preferably within a range of 0.07 to 0.15 mass %. Furthermore, the ratio of 1,000 times the mass of the surfactant to the water-soluble organic solvent (surfactant×1,000/water-soluble organic solvent) is preferably 0.5 or more, more preferably within a range of 0.93 to 13.33, and particularly preferably within a range of 2.00 to 6.67.

The water is preferably deionized water or pure water. The water content relative to the total mass of cleaning liquid is preferably, for example, 40 mass % or less, more preferably within a range of 30 mass % or less. The water content may be, for example, the remainder after other components.

The viscosity of the cleaning liquid is preferably 8 mPa·s or greater, more preferably 12 mPa·s or greater, and particularly preferably within a range of 20 mPa·s to 40 mPa·s.

The surface tension of the cleaning liquid is preferably 50 mN/m or less, more preferably 45 mN/m or less, and particularly preferably 40 mN/m or less.

The initial contact angle of the cleaning liquid with respect to the nozzle surface is preferably 105° or less. The rate at which droplets of the cleaning liquid slide down on the nozzle surface is preferably 3.0 mm/s or less, more preferably 2.5 mm/s or less.

The speed at which the droplet of the cleaning liquid slides down on the nozzle surface and the initial contact angle to the nozzle surface can be measured as follows. Dynamic contact angle measurement was performed by dripping 4 μL of cleaning liquid onto a stainless steel plate on which surface a fluorine compound was coated as the nozzle surface, and the contact angle at the time of droplet formation and the slide down rate at the time of slide-down start were measured using a fully automatic contact angle meter DMo-701 made by Kyowa Interface Science Co., Ltd.

EXAMPLES

Examples of the present disclosure will be described below along with comparative examples. Note that the present disclosure is not limited to or constricted by the following examples and comparative examples.

[Preparation of Cleaning Liquid]

The cleaning liquids of Examples 1 through 10 and Comparative Examples 1 through 9 were obtained by uniformly mixing water with a water-soluble organic solvent and a surfactant in the amounts shown in Table 1.

Water-soluble organic solvent: glycerol (saturated vapor pressure at 20° C.: 0.01 Pa), polyethylene glycol #200 (saturated vapor pressure at 20° C.: 0.38 Pa), triethylene glycol (saturated vapor pressure at 20° C.: 0.02 Pa), diethylene glycol (saturated vapor pressure at 20° C.: 0.76 Pa), propylene glycol (saturated vapor pressure at 20° C.: 10.6 Pa).

Surfactant: Sunnol NL-1430 (made by Lion Specialty Chemicals Co., Ltd., main component: polyoxyethylene alkyl (12, 13) ether sodium sulfate (3E.O.), anionic), Amphitol 20AB (made by Kao Corporation, main component: lauric acid amidopropyl betaine, amphoteric), Neopelex G-15 (made by Kao Co., Ltd., main component: sodium dodecyl benzene sulfonate, anionic), BYK-348 (made by BYK-Chemie Japan Co., Ltd., main component: polyether modified siloxane, anionic), Olfine E1010 (made by Nissin Chemical Industry Co., Ltd., main component: acetylene glycol based, nonpolar)

TABLE 1

| | | Active ingredient amount | Example 1 | Example 2 | Example 3 | Example 4 | Example 5 | Example 6 |
|---|---|---|---|---|---|---|---|---|
| Solvent A | Glycerol | 86.0 | 87.21 | 87.21 | 87.21 | 87.21 | 87.21 | |
| | (active ingredient) | | (75.00) | (75.00) | (75.00) | (75.00) | (75.00) | |
| | Polyethylene glycol #200 | 100.0 | | | | | | 75.00 |
| | Triethylene glycol | 100.0 | | | | | | |
| | Diethylene glycol | 100.0 | | | | | | |
| | Propylene glycol | 100.0 | | | | | | |
| Surfactant | Sunnol NL-1430 | 28.0 | 1.00 | | | | | 1.00 |
| | (active ingredient) | | (0.28) | | | | | (0.28) |
| | Amphitol 20AB | 30.0 | | 1.00 | 0.50 | | | |
| | (active ingredient) | | | (0.30) | (0.15) | | | |
| | Neopelex G-15 | 16.0 | | | | 6.25 | | |
| | (active ingredient) | | | | | (1.00) | | |
| | BYK-348 | 100.0 | | | | | 0.50 | |
| | (active gradient) | | | | | | (0.50) | |
| | Olfine E1010 | 100.0 | | | | | | |
| | (active ingredient) | | | | | | | |
| | Pure water | | Remainder | Remainder | Remainder | Remainder | Remainder | Remainder |
| Physical properties of cleaning liquid | Slide down speed (mm/s) | | 1.0 | 2.2 | 2.2 | 2.8 | 1.3 | 1.3 |
| | Surfactant/solvent A × 1000 | | 3.73 | 4.00 | 2.00 | 13.33 | 5.67 | 3.73 |
| | Viscosity @ 25° C. (mPa · s) | | 28.4 | 26.3 | 26.8 | 31.1 | 28.7 | 22.9 |
| | Surface tension (mN/m) | | 36.64 | 33.65 | 33.96 | 36.41 | 26.82 | 47.21 |
| | Initial contact angle (degrees) | | 95 | 94 | 94 | 91 | 101 | 99 |
| | Level of residue on water-repellent film | | A | A | A | B | A | A |

| | | Active ingredient amount | Example 7 | Example 8 | Example 9 | Example 10 | Comparative Example 1 |
|---|---|---|---|---|---|---|---|
| Solvent A | Glycerol | 86.0 | | | | 87.21 | 87.21 |
| | (active ingredient) | | | | | (75.00) | (75.00) |
| | Polyethylene glycol #200 | 100.0 | 75.00 | | | | |
| | Triethylene glycol | 100.0 | | 75.00 | | | |
| | Diethylene glycol | 100.0 | | | 75.00 | | |
| | Propylene glycol | 100.0 | | | | | |
| Surfactant | Sunnol NL-1430 | 28.0 | 0.25 | 1.00 | 1.00 | | 0.06 |
| | (active ingredient) | | (0.07) | (0.28) | (0.28) | | (0.016) |
| | Amphitol 20AB | 30.0 | | | | | |
| | (active ingredient) | | | | | | |
| | Neopelex G-15 | 16.0 | | | | | |
| | (active ingredient) | | | | | | |
| | BYK-348 | 100.0 | | | | | |
| | (active gradient) | | | | | | |
| | Olfine E1010 | 100.0 | | | | 0.10 | |
| | (active ingredient) | | | | | (0.10) | |
| | Pure water | | Remainder | Remainder | Remainder | Remainder | Remainder |
| Physical properties of cleaning liquid | Slide down speed (mm/s) | | 2.8 | 2.5 | 2.2 | 1.3 | 3.1 |
| | Surfactant/solvent A × 1000 | | 0.93 | 3.73 | 3.73 | 1.33 | 0.23 |
| | Viscosity @ 25° C. (mPa · s) | | 21.7 | 16.6 | 12.0 | 27.2 | 26.7 |
| | Surface tension (mN/m) | | 50.42 | 47.01 | 45.92 | 34.91 | 53.54 |
| | Initial contact angle (degrees) | | 102 | 104 | 99 | 95 | 110 |
| | Level of residue on water-repellent film | | B | A | A | A | D |

| | | Active ingredient amount | Comparative Example 2 | Comparative Example 3 | Comparative Example 4 | Comparative Example 5 | Comparative Example 6 |
|---|---|---|---|---|---|---|---|
| Solvent A | Glycerol | 86.0 | | 43.60 | | | |
| | (active ingredient) | | | (37.50) | | | |
| | Polyethylene glycol #200 | 100.0 | 75.00 | | 58.14 | | |
| | Triethylene glycol | 100.0 | | | | 37.50 | |
| | Diethylene glycol | 100.0 | | | | | 50.00 |
| | Propylene glycol | 100.0 | | | | | |
| | Tripropylene glycol | 100.0 | | | | | |
| Surfactant | Sunnol NL-1430 | 28.0 | | 0.50 | 0.50 | 0.50 | 0.75 |
| | (active ingredient) | | | (0.14) | (0.14) | (0.14) | (0.21) |
| | Amphitol 20AB | 30.0 | | | | | |
| | (active ingredient) | | | | | | |
| | Neopelex G-15 | 16.0 | | | | | |
| | (active ingredient) | | | | | | |

TABLE 1-continued

| | | | | | | | |
|---|---|---|---|---|---|---|---|
| | BYK-348 (active gradient) | 100.0 | | | | | |
| | Olfine E1010 (active ingredient) | 100.0 | | | | | |
| | Pure water | | Remainder | Remainder | Remainder | Remainder | Remainder |
| Physical properties of cleaning liquid | Slide down speed (mm/s) | | 3.4 | 4.4 | 3.1 | 4.7 | 3.2 |
| | Surfactant/solvent A × 1000 | | 0.00 | 3.72 | 2.41 | 3.79 | 4.20 |
| | Viscosity @ 25° C. (mPa · s) | | 22.0 | 2.8 | 9.7 | 3.2 | 4.4 |
| | Surface tension (mN/m) | | 49.08 | 38.66 | 44.18 | 32.13 | 34.01 |
| | Initial contact angle (degrees) | | 101 | 110 | 101 | 81 | 79 |
| Level of residue on water-repellent film | | | D | D | D | D | D |

| | | Active ingredient amount | Comparative Example 7 | Comparative Example 8 | Comparative Example 9 |
|---|---|---|---|---|---|
| Solvent A | Glycerol (active ingredient) | 86.0 | | | |
| | Polyethylene glycol #200 | 100.0 | | | |
| | Triethylene glycol | 100.0 | | | |
| | Diethylene glycol | 100.0 | 37.50 | | |
| | Propylene glycol | 100.0 | | 75.00 | |
| | Tripropylene glycol | 100.0 | | | |
| Surfactant | Sunnol NL-1430 (active ingredient) | 28.0 | 0.50 (0.14) | 1.00 (0.28) | |
| | Amphitol 20AB (active ingredient) | 30.0 | | | |
| | Neopelex G-15 (active ingredient) | 16.0 | | | |
| | BYK-348 (active gradient) | 100.0 | | | |
| | Olfine E1010 (active ingredient) | 100.0 | | | |
| | Pure water | | Remainder | Remainder | Remainder |
| Physical properties of cleaning liquid | Slide down speed (mm/s) | | 4.1 | 3.4 | — |
| | Surfactant/solvent A × 1000 | | 3.73 | 3.73 | 0.00 |
| | Viscosity @ 25° C. (mPa · s) | | 2.9 | 13.4 | 0.9 |
| | Surface tension (mN/m) | | 33.68 | 40.48 | 72.00 |
| | Initial contact angle (degrees) | | 89 | 95 | 107 |
| Level of residue on water-repellent film | | | D | E | D |

[Residue on Nozzle Surface]

2 μL of the cleaning liquid of Examples 1 through 10 and Examples 1 through 9 was dripped on a stainless steel plate on which surface a fluorine compound was coated as the nozzle surface, and the wiper was moved 60 mm along the nozzle surface at 40 mm/sec while the tip of the rubber wiper was kept in contact with the nozzle surface. The location on the nozzle surface where the tip of the wiper contacts was observed with the naked eye and under a microscope and determined based on the following criteria. The results thereof are shown in Table 1.

A: A large amount of remaining cleaning liquid can be seen with the naked eye, and white marks remain.

B: Remaining cleaning liquid can be seen with the naked eye, and translucent marks remain.

D: A very small amount of remaining cleaning liquid can be seen with the naked eye, and substantially no marks remain.

E: Remaining cleaning liquid cannot be seen with the naked eye.

As shown in Table 1, the remaining amount on the nozzle surface was evaluated as A or B in Examples 1 through 10, but it was evaluated as D or E for Comparative Examples 1 through 9. Furthermore, in Examples 1 to 3, 5, 6, and 8 to 10, those for which the rate at which droplets of the cleaning liquid sliding down the nozzle surface was 2.5 mm/sec or less were evaluated as A.

Obviously, numerous modifications and variations of the present invention(s) are possible in light of the above teachings. It is therefore to be understood that within the scope of the appended claims, the invention(s) may be practiced otherwise than as specifically described herein.

The invention claimed is:

1. A cleaning liquid, wherein the cleaning liquid is suitable for cleaning a nozzle surface of a printer head which discharges a water-based ink from the nozzle, the cleaning liquid comprising:

a water-soluble organic solvent; and a surfactant wherein a mass of the surfactant in the cleaning liquid relative to a total mass of the cleaning liquid is in a range of 0.07 to 1.00 mass %, wherein:

the water-soluble organic solvent comprises a low-vapor-pressure solvent having a saturated vapor pressure of 1.0 Pa or less at 20° C.;

a ratio of 1,000 times a total mass of the surfactant to a mass of the water-soluble organic solvent is within a range of 0.9 to 14;

a rate at which droplets of the cleaning liquid slide down on a surface to be cleaned is 3.0 mm/s or less;

a mass of the low-vapor-pressure solvent relative to a total mass of the water-soluble organic solvent is 70 mass % or more; and a mass of water in the cleaning liquid relative to the total mass of the cleaning liquid is 30 mass % or less.

2. The cleaning liquid according to claim 1, wherein the rate at which droplets of the cleaning liquid slide down on the surface to be cleaned is 2.5 mm/s or less.

3. The cleaning liquid according to claim 1, wherein a viscosity of the cleaning liquid at 25° C. is 8 mPa·s or greater.

4. The cleaning liquid according to claim 1, wherein a surface tension of the cleaning liquid is 50 mN/m or less.

5. The cleaning liquid according to claim 1, wherein an initial contact angle of the droplets with respect to the surface to be cleaned is 105° or less.

6. The cleaning liquid according to claim 1, wherein the water-soluble organic solvent comprises at least one selected from the group consisting of glycerol, polyethylene glycol, triethylene glycol, and diethylene glycol.

7. A method of cleaning a nozzle surface of a printer head, comprising:

attaching the cleaning liquid according to claim 1 to a wiper; and sliding the wiper on the nozzle surface after the nozzle discharges a water-based ink.

8. The method according to claim 7, further comprising:

contacting a wiper cleaning member with the cleaning liquid; and bringing a tip of the wiper and the wiper cleaning member into contact to attach the cleaning liquid to the wiper, wherein the tip of the wiper is slid on the nozzle surface.

9. The method according to claim 7, wherein the rate at which droplets of the cleaning liquid slide down on the nozzle surface is 2.5 mm/s or less.

10. The method according to claim 7, wherein a viscosity of the cleaning liquid at 25° C. is 8 mPa·s or greater.

11. The method according to claim 7, wherein a surface tension of the cleaning liquid is 50 mN/m or less.

12. The method according to claim 7, wherein an initial contact angle of the droplets with respect to the nozzle surface is 105° or less.

13. The method according to claim 7, wherein the water-soluble organic solvent comprises at least one selected from the group consisting of glycerol, polyethylene glycol, triethylene glycol, and diethylene glycol.

14. A recording device, comprising a head comprising a nozzle which discharges a water-based ink from the nozzle, a wiper comprising a tip part to wipe a nozzle surface of the head, a wiper cleaning member configured to contact the tip part, and the cleaning liquid according to claim 1, held by the wiper cleaning member.

* * * * *